(12) United States Patent
Strege et al.

(10) Patent No.: US 12,287,190 B2
(45) Date of Patent: Apr. 29, 2025

(54) SYSTEM AND METHOD FOR VERIFYING ADAS CALIBRATION TARGET SELECTION

(71) Applicant: Hunter Engineering Company, Bridgeton, MO (US)

(72) Inventors: Timothy A. Strege, Sunset Hills, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 1051 days.

(21) Appl. No.: 17/230,567

(22) Filed: Apr. 14, 2021

(65) Prior Publication Data

US 2021/0318117 A1    Oct. 14, 2021

Related U.S. Application Data

(60) Provisional application No. 63/009,838, filed on Apr. 14, 2020.

(51) Int. Cl.
*G01B 11/275* (2006.01)
*G06K 7/10* (2006.01)
*G06K 7/14* (2006.01)

(52) U.S. Cl.
CPC ...... *G01B 11/2755* (2013.01); *G06K 7/10722* (2013.01); *G06K 7/1417* (2013.01); *G06K 7/1443* (2013.01); *G01B 2210/12* (2013.01); *G01B 2210/143* (2013.01)

(58) Field of Classification Search
None
See application file for complete search history.

(56) References Cited

U.S. PATENT DOCUMENTS

| | | | |
|---|---|---|---|
| 6,583,868 B2 | 6/2003 | Hopfenmuller | |
| 7,382,913 B2 | 6/2008 | Dorranc et al. | |
| 8,244,024 B2 | 8/2012 | Dorrance et al. | |
| 8,341,848 B2 | 1/2013 | Stieff et al. | |
| 2002/0092183 A1* | 7/2002 | Jackson | G01B 5/255 33/203.18 |
| 2019/0249985 A1 | 8/2019 | Stieff et al. | |
| 2019/0331482 A1* | 10/2019 | Lawrence | G07C 5/08 |
| 2020/0141724 A1* | 5/2020 | Lawrence | G01B 11/272 |

FOREIGN PATENT DOCUMENTS

WO     2018067354 A1    4/2018

* cited by examiner

*Primary Examiner* — Luke D Ratcliffe
(74) *Attorney, Agent, or Firm* — Sandberg Phoenix & von Gontard P.C.

(57) ABSTRACT

A vehicle service system including a set of cameras and a processing system configured to access a database of vehicle-specific information, which includes data identifying vehicle-specific targets and/or service fixtures. The processing system is configured with a user interface to convey instructions to an operator, including the identification of vehicle-specific targets and/or service fixtures required to carry out a selected vehicle service. The processing system subsequently evaluates images acquired from the set of cameras to identify features present within the images, including placed vehicle-specific targets, from which identification of, and verification of correctly selected, vehicle-specific targets is made.

15 Claims, 6 Drawing Sheets

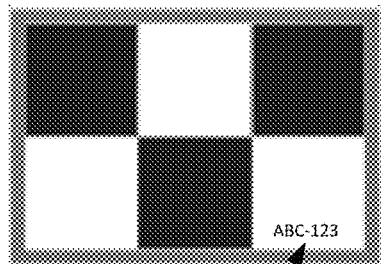
Fig. 5A
PRIOR ART
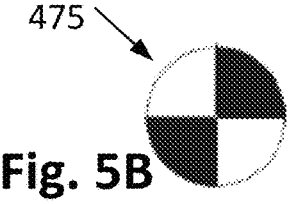
Fig. 5B
PRIOR ART
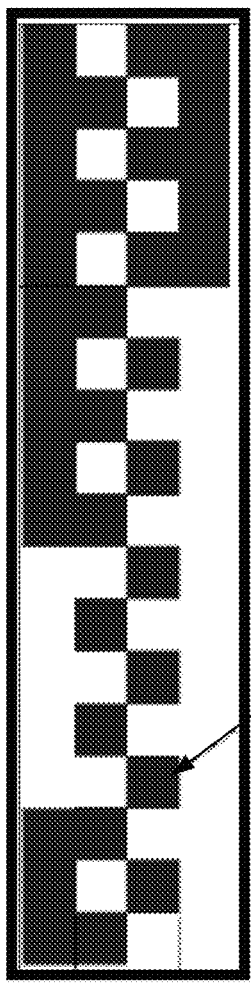
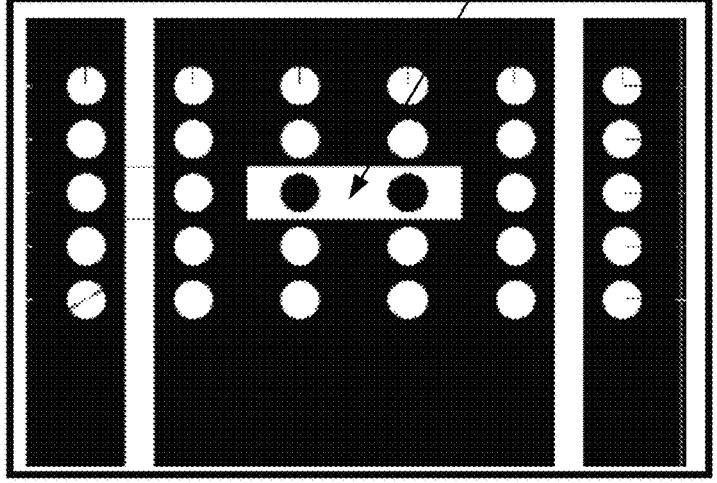
Fig. 5C
PRIOR ART
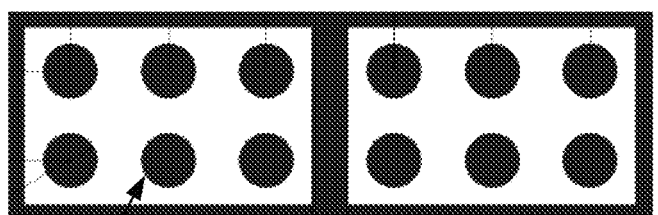
Fig. 5D
PRIOR ART
Fig. 5E
PRIOR ART

SYSTEM AND METHOD FOR VERIFYING ADAS CALIBRATION TARGET SELECTION

CROSS-REFERENCE TO RELATED APPLICATIONS

The present application is related to, and claims priority from, U.S. Provisional Patent Application Ser. No. 63/009,838 filed on Apr. 14, 2020, and which is herein incorporated by reference.

STATEMENT REGARDING FEDERALLY SPONSORED RESEARCH

Not Applicable.

BACKGROUND OF THE INVENTION

The present application is related generally to methods and system for performing a vehicle advanced driver assistance system (ADAS) sensor inspection or calibration using one or more optical targets positioned relative to a vehicle undergoing service, and in particular, to a method and system for identifying to an operator vehicle-specific optical targets for use during the vehicle service, and for automatically verifying proper target selection following target placement in proximity to the vehicle.

Vehicle wheel measurement systems, such as wheel alignment or inspection systems employing machine vision technology, such as cameras observing optical targets mounted on various surfaces within associated fields of view are well known. These systems employ cameras mounted to a fixture or structure commonly located in front of a vehicle service area. The cameras are oriented such that each wheel (or wheel target) of a vehicle within the service area is visible to at least one of the cameras. The structure supporting the cameras may be fixed in place, or may be mobile, configured to be moved from one service area to another as needed. The cameras may be vertically (and/or rotationally) adjustable to accommodate vehicles at different elevations on a lift rack within the vehicle service area. Images acquired by the cameras are conveyed to a processing system configured with suitable software instructions for identifying observed surfaces (such as target), for determining various spatial measurements associated with the observed surfaces, and for identifying vehicle wheel alignment angles from the determined spatial measurements.

When it is necessary to realign or recalibrate various ADAS sensors, such as radar units or optical sensors, specialized targets or fixtures are precisely positioned in proximity to the vehicle, often with the aid of a vehicle measurement system such as a wheel alignment or inspection system. For example, U.S. Pat. No. 7,382,913 B2 to Dorrance describes a method and apparatus for guiding placement of a vehicle service apparatus relative to a vehicle, based on measurements acquired by a separate vehicle wheel alignment measurement system. Alternatively, as described in U.S. Pat. No. 8,244,024 B1 to Dorrance et al. a vehicle service apparatus can be guided for placement relative to a vehicle using images acquired by cameras mounted on the apparatus itself, without the need to acquire measurements from a separate vehicle wheel alignment measurement system. Other techniques for guiding placement of a specialized structure relative to a vehicle undergoing a realignment or recalibration of a vehicle safety system sensor include the use of laser emitters and leveling devices, such as shown in U.S. Pat. No. 6,583,868 B2 to Hopfenmuller.

Movable fixtures or support structures capable of supporting both the cameras associated with a vehicle measurement system as well as targets required for realignment or recalibration of onboard vehicle safety system sensor, such as shown in Published International Patent Application No. WO 2018/067354 A1 to Hunter Engineering Company have been developed, thereby reducing the total number of fixtures required to complete a vehicle onboard sensor realignment or recalibration, and eliminating potential spatial conflicts between support structures and targets or fixtures.

Some targets or fixtures used in the alignment or calibration of onboard vehicle ADAS sensors, such as floor mats or free-standing reflectors, are independent of the vehicle measurement system, and are placed alongside or behind a vehicle during a procedure. The specific target or fixture to be utilized may vary across different vehicle manufacturers, the specific vehicle onboard ADAS sensor procedure being conducted, and vehicle models/years of manufacture. Due to varying optical patterns, appearance, and structural configuration, most targets or fixtures are not interchangeable between different vehicle models and procedures. When utilizing such targets or fixtures, an operator is provided with guidance to place the targets or fixtures relative to either the vehicle undergoing service, or to the vehicle measurement system. Such guidance can take the form of specific instructions directing the operator to locate a placement location using manual measurement techniques, or may be in the form of visual aids such as laser spots or lines guiding the operator to the placement location.

In order to continue the alignment or calibration of the onboard vehicle safety system sensor, the processing system assumes that the operator has selected the correct target or fixture for the specific vehicle undergoing service, and has correctly followed the provided guidance for proper placement of the targets or fixtures. If the operator fails to select the correct target or fixture, the resulting alignment or calibration of the onboard vehicle ADAS sensor may fail, or worse, may not achieve the intended results.

Accordingly, it would be advantageous to provide a system and method for verifying that the operator has selected the correct target or fixture for placement and use during the onboard vehicle ADAS sensor inspection or calibration. An additional benefit would be the capacity to generate a record of the verified target selection by the operator to associate with the vehicle service records for purposes of warranty approval and subsequent vehicle service audits.

BRIEF SUMMARY OF THE INVENTION

Briefly stated, the present disclosure sets forth a vehicle service system including a structure supporting a set of cameras together with at least one optical projection system configured to project visible indicia, such as points or lines, onto surfaces in proximity to the structure to guide relative placement of targets and/or service fixtures. A camera support member mounted to the structure locates the set of cameras in a vertically-adjustable, spaced arrangement to view features or objects within a vehicle service area, and provides a mounting for the optical projection system. The set of cameras and the optical projection system are operatively coupled to a processing system configured with a set of software instructions to carry out the operation of the vehicle service system and associated components. The processing system is configured to access a database of vehicle-specific information, which includes data identifying vehicle-specific targets and/or service fixtures. The database may be stored in a local data repository, or may be remotely located, accessible to the processing system via a suitable communication link. The processing system is further configured with an operator interface, such as a graphical user interface (GUI), through which instructions are conveyed to the operator, including an identification of vehicle-specific targets and/or service fixtures required to carry out a selected vehicle service. Software instructions enable the processing system to evaluate images acquired from the set of cameras to identify features present within the images, including placed vehicle-specific targets, from which a verification of correctly selected vehicle-specific targets and/or service fixtures is made by comparing identifying markings located within the acquired images to expected markings recalled from the database in association with the data identifying the vehicle-specific targets and/or service fixtures.

A further embodiment of the present disclosure sets forth a method for vehicle service system to verify proper selection of vehicle-specific ADAS targets and/or fixtures by an operator during a vehicle ADAS sensor inspection or calibration procedure. Initially, an identification of the vehicle undergoing the inspection or calibration procedure is made with sufficient specificity to provide a match between the identified vehicle and a vehicle-specific ADAS target and/or fixture cross-referenced within a data repository accessible to the vehicle service system. Optionally, additional information, such as, but not limited to, the specific procedure being performed, or the specific vehicle component undergoing inspection or calibration may be utilized to establish the match. The vehicle and/or procedure/component identification to the vehicle service system may be made manually by an operator through a suitable interface, such as the GUI, or automatically by a processing system configured with software instructions as part of a vehicle service process. Upon determination of the match, the required vehicle-specific ADAS target and/or fixture is identified by the vehicle service system to the operator who in turn, retrieves the matching target and/or fixture from storage for placement within the vehicle service area in accordance with associated placement instructions. Once the target and/or fixture is properly placed, the vehicle service system acquires an image of the target and/or fixture via a camera system, and the processing system evaluates the image to identify one or more identifying visible features. The target and/or fixture identification is compared with the identification of the required vehicle-specific ADAS target and/or fixture to verify the operator has made the correct selection before continuing the vehicle inspection or calibration procedure.

In a further embodiment, acquired images of placed targets and/or fixtures are evaluated to locate visible target-specific identifying features such as bar-codes, symbols, or alpha-numeric markings. Located target-specific identifying features are compared by a processing system programmed with software instructions to corresponding target-specific identifying features associated with the required vehicle-specific ADAS targets and/or fixtures to verify correct target and/or fixture selection.

In yet another embodiment, targets and/or fixtures for observation by a camera system during a vehicle ADAS sensor inspection or calibration procedure are configured with one or more target-specific identifying features which do not form a part of the target or fixture feature set observed by vehicle ADAS sensor during an inspection or calibration procedure. These target-specific identifying features include 2D and/or 3D bar-codes, symbols, or alpha-numeric markings. Optionally, the target-specific identifying features are distinct in placement, color, or contrast from the feature set on the target or fixture which form a visible pattern intended for observation by the vehicle ADAS sensor.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIGS. 5A-5E are illustrations of exemplary targets for use during a vehicle onboard ADAS sensor inspection or calibration procedure.

Corresponding reference numerals indicate corresponding parts throughout the several figures of the drawings. It is to be understood that the drawings are for illustrating the concepts set forth in the present disclosure and are not to scale.

Figure 1:
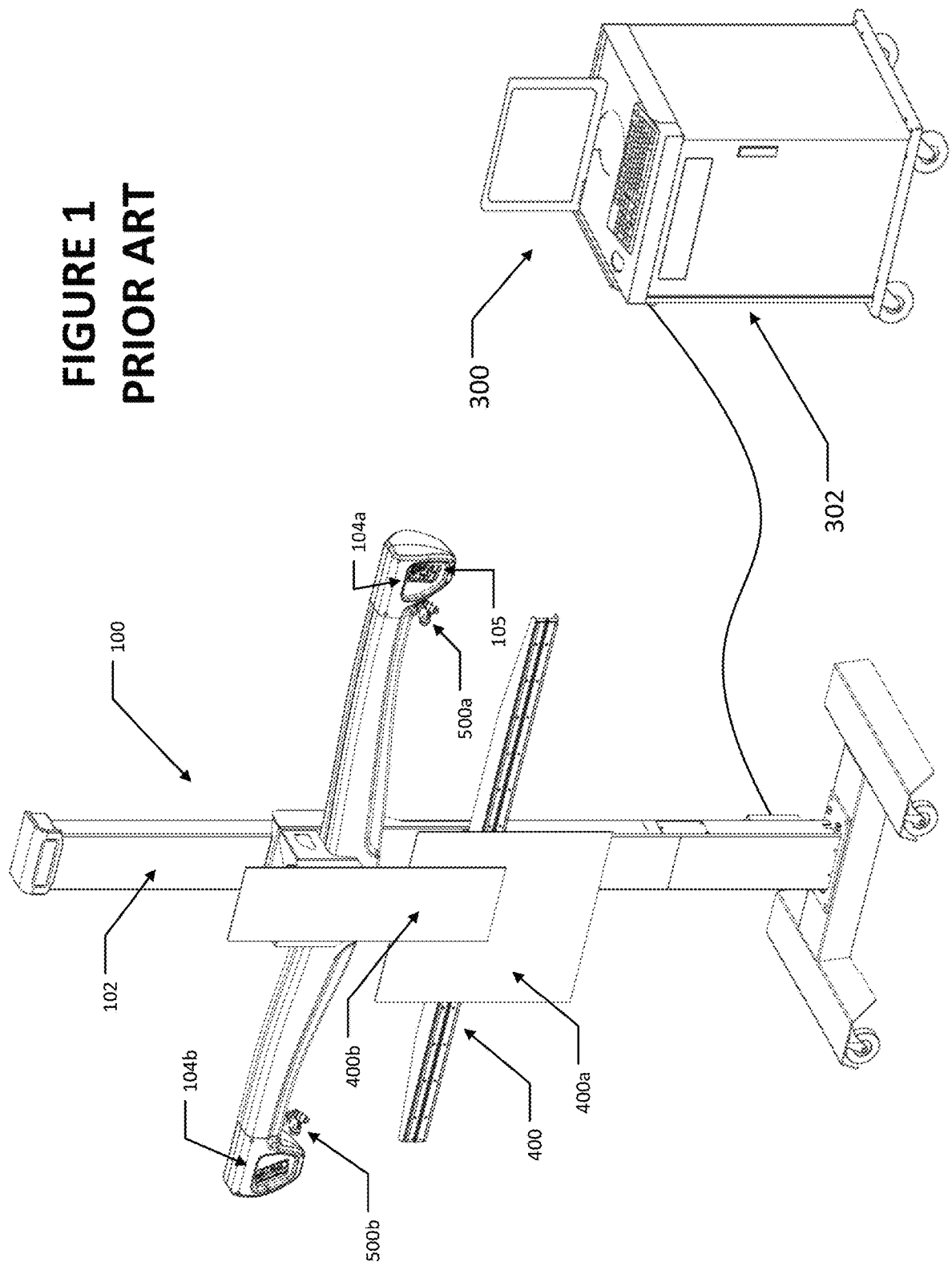
FIG. 1 is a perspective view of a prior art camera and target support structure configured with a pair of gimbal-mounted projection systems.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

An exemplary vehicle service system 100, suitable for inspecting or calibrating a vehicle ADAS sensor, includes a structure 102 supporting a set of laterally spaced camera modules 104*a*, 104*b* and optical projectors 500*a*, 500*b*. The camera modules 104*a*, 104*b* are configured with cameras providing fields of view (FOV) oriented to observe regions on laterally opposite sides of a vehicle 10 undergoing service positioned with a vehicle service area. The structure 102 may include components to adjust elevation and rotation of the camera modules 104*a*, 104*b* as necessary accommodate positioning of the vehicle 10 on an adjustable lift rack (not shown), or to accommodate changes in the placement of the vehicle service system 100 relative to the vehicle 10. Additional details of the vehicle service system 100 are set forth and described in U.S. Patent Application Publication No. 2019/0249985 A1 to Stieff et al., which is herein incorporated by reference.

Figure 2:
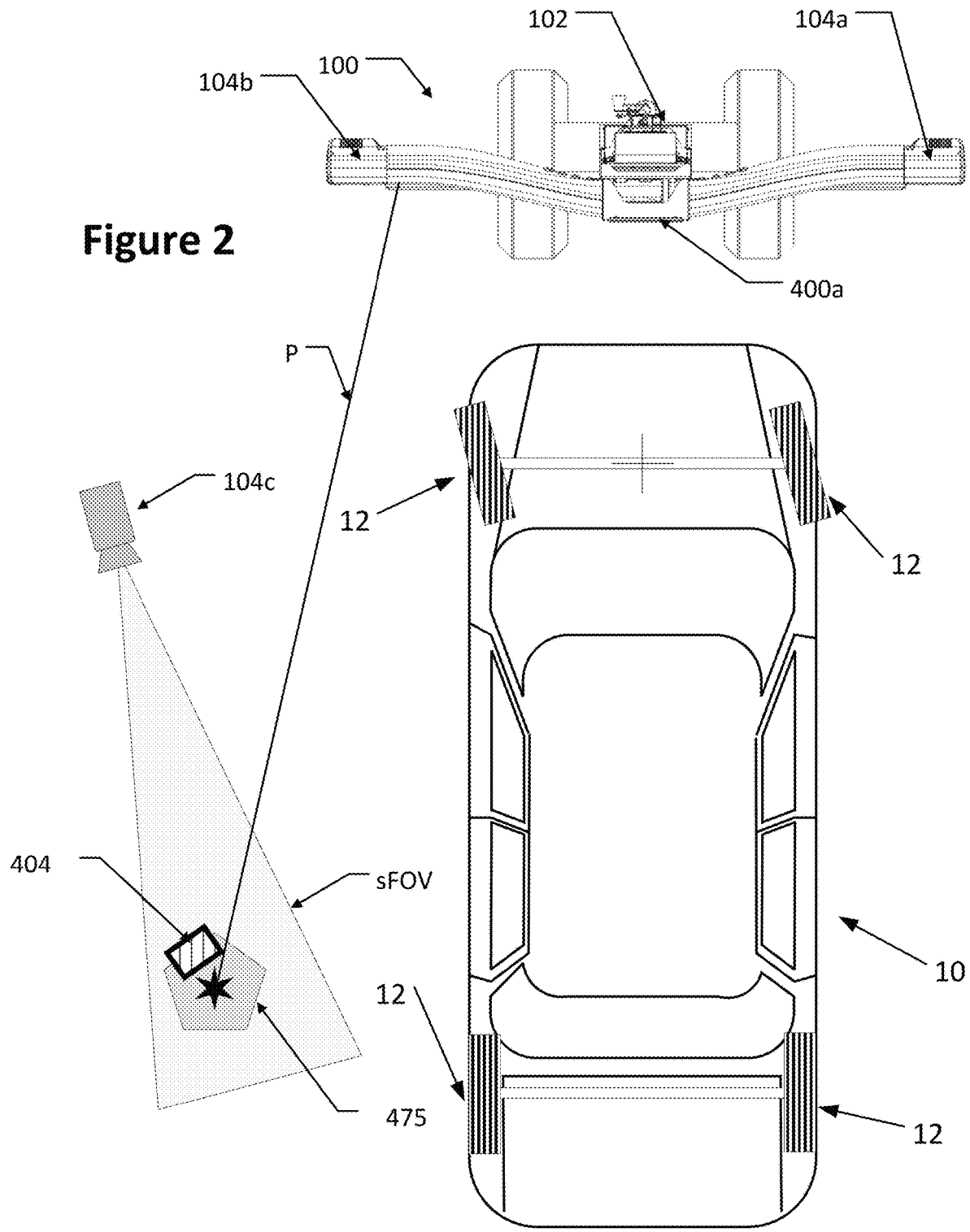
FIG. 2 is a top plan view of the system of FIG. 1 illustrating projected visible indicia for placement guidance, and an additional camera system located independent of the support structure for observing the placed target and/or fixture.
Figure 3:
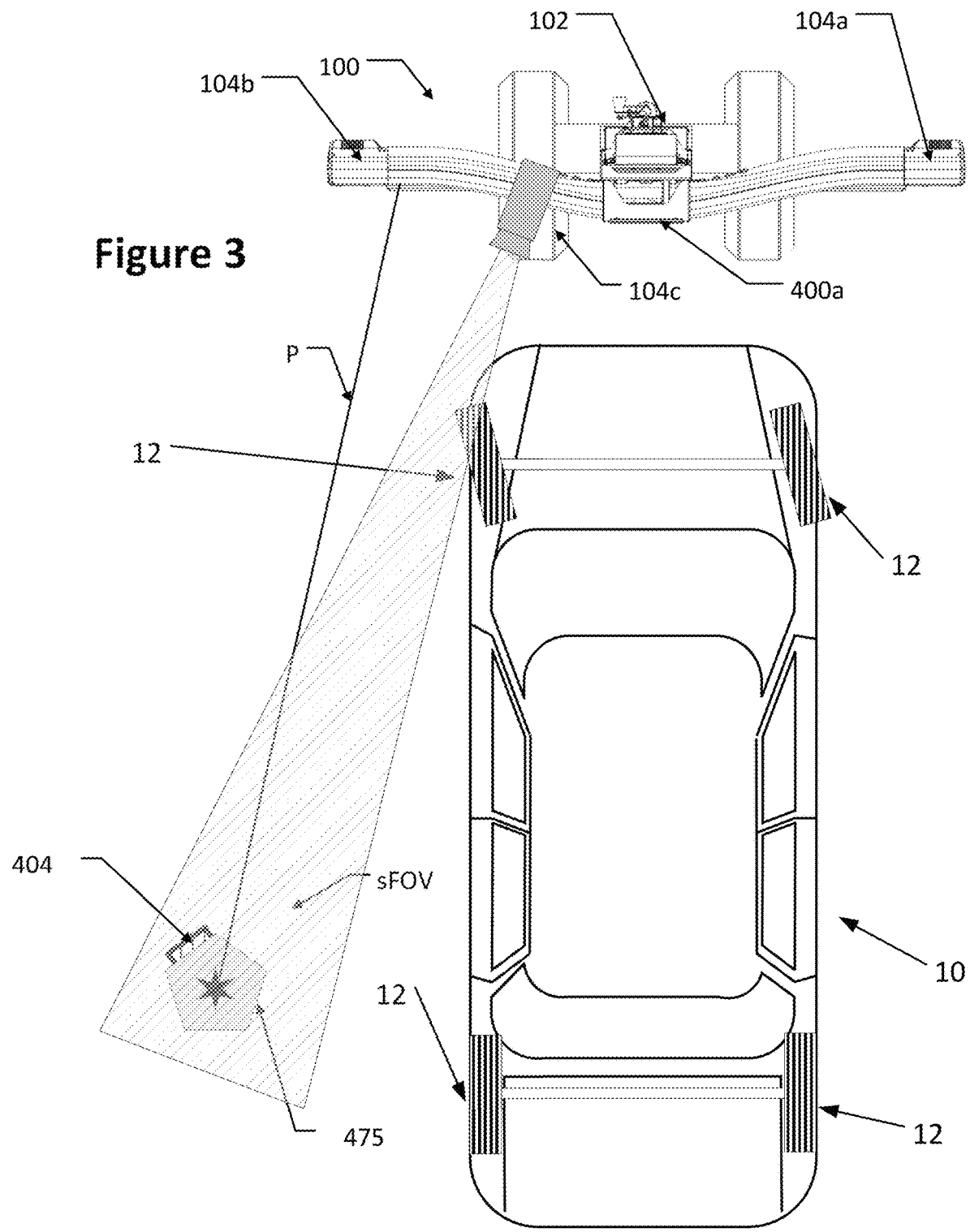
FIG. 3 is a top plan view of the system of FIG. 1 illustrating projected visible indicia for placement guidance and an additional camera system located on the support structure for observing the placed target and/or fixture.

As seen in FIG. 2, an optional camera module 104c associated with the vehicle service system 100 is disposed as needed to provide a supplemental field of view (sFOV) for observing the vehicle service area, and configured as required with optical elements to optimize images of the sFOV. The camera module 104c, may be mounted either independent of the support structure 102, or on the support structure 102 but separate from the vehicle measurement camera modules 104a, 104b, as seen in FIG. 3.

The vehicle service system 100 is operatively controlled by a suitably programmed processing system 300, which may be disposed within an associated console 302 carried by the structure 102, in proximity to the structure 102, or at a remote location from the structure 102. The processing system 300 is configured with suitable logic circuit components, software instructions, and input/output hardware to provide an operator interface, such as a graphical user interface (GUI), for operator interaction. The processing system 300 is further configured to operate the various components of the vehicle service system 100 necessary to perform various vehicle service/inspection/measurement procedures, including the camera modules 104a-c. Each of the camera modules 104a-c is operatively connected to the processing system 300 via a suitable communications pathway, either wired or wireless. For example, the processing system 300 is configured to receive and process image data from the camera modules 104a-c to identify relative spatial positions of observed surfaces, such as optical targets coupled to the vehicle wheels or placed on surfaces of a vehicle 10, to determine spatial transformations between various individual frames of reference, and to compute associated vehicle characteristics such as wheel alignment angles or vehicle spatial positions and orientations. It will be understood that the configuration of the processing system 300, camera modules 104a-c, and console 302 are generally known in the art of machine vision vehicle wheel alignment systems, and may vary from the configuration described herein without departing from the scope of the invention. For example, the processing system 300 may be configured with software instructions to function as an interface to exchange data with one or more remote processing systems implementing software instructions to perform required calculations and/or store data, such as may be found in a cloud-based vehicle service system.

In various configurations, the vehicle service system 100 includes a target mount 400 affixed to the support structure 102. The target mount 400 is configured for securing one or more observable target panels 400a, 400b in a forward orientation relative to the fixture or support structure 102 (i.e., towards the vehicle location within the vehicle service area), at an elevation generally suitable for observation by the safety system sensors onboard the vehicle 10 during a realignment or recalibration procedure. The specific configuration of the target mount 400 and the observable target panels 400a, 400b, is related to, and will vary with, the specific vehicle and type of safety system sensor for which the targets will be used.

The vehicle service system 100 optionally includes one or more gimbal-mounted optical projectors 500a, 500b operatively coupled to, and under control of, the processing system 300. Each optical projector 500a, 500b is configured for the projection of visible indicia 501 along a projection axis P onto surfaces within the vehicle service area, such as shown in FIGS. 2 and 3. The projected visible indicia may be of any form suitable, such as an illuminated point or illuminated line. Exemplary surfaces onto which visible indicia may be projected include the vehicle 10, targets mounted to the wheels 12, fixture targets, or locations on the vehicle service area surfaces.

In a further embodiment, the vehicle service system 100 includes an optical bar-code scanning device (not shown) operatively coupled to the processing system 300 for acquiring and communicating data encoded in visible bar-codes, such as vehicle identification numbers (VINs), serial numbers, part numbers, or other elements of encoded data. As is well known in the automotive service industry, the optical bar-code scanning device may consist of a portable or hand-held unit to enable an operator to quickly and easily scan bar code stickers or markings at various locations about a vehicle undergoing service.

Figure 6:
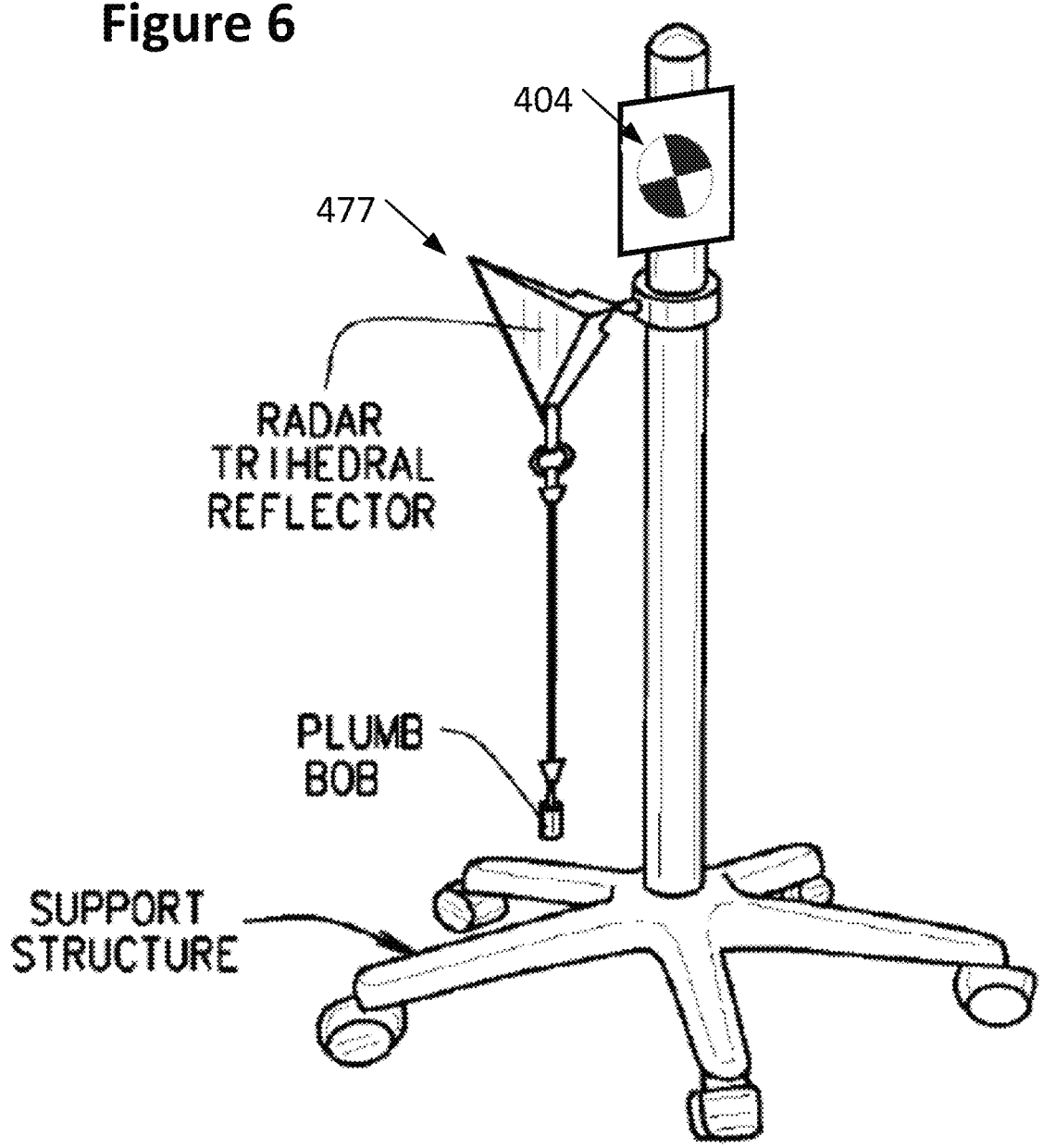
FIG. 6 is an illustration of an exemplary radar reflective fixture including identifying indicia.

The processing system 300 is configured with software instructions to identify, during a vehicle onboard ADAS sensor service or inspection procedure, the specific type of target 475 or fixture which the operator should utilize for the specific vehicle (and specific procedure being performed), as well as the proper placement location for the target 475 or fixture in relation to the vehicle. A variety of exemplary vehicle-specific target patterns are illustrated in FIGS. 5A-5E, and an exemplary radar-reflective fixture 477 is illustrated in FIG. 6. It will be understood that the term "vehicle-specific" as used herein is not intended require that a target 475 or fixture 477 be limited to use with a single vehicle. Rather, a vehicle-specific target 475 or fixture 477 shall be understood to merely refer to the target 475 or fixture 477 which is required to carry out the inspection, measurement, or calibration procedure currently being conducted by the processing system 300, and any given target 475 or fixture 477 may be utilized with a variety of different vehicles, makes, or models, if required by the manufacturer of each vehicle. Vehicle-specific (and/or procedure-specific) target 475 or fixture 477 selection and placement requirements associated with vehicle onboard ADAS sensor procedures for may be stored in a vehicle-indexed database 476 accessible to the processing system 300, either locally or remotely via a communications network. A variety of methods may be utilized to enable the processing system 300 to identify the specific type of target 475 or fixture 477.

In one embodiment of the present disclosure, the processing system 300 is configured with a set of software instructions to utilize vehicle identifying information acquired at a prior stage of a vehicle service or inspection procedure to identify a specific type of target 475 or fixture 477 required to complete a selected procedure associated with a vehicle onboard ADAS sensor. For example, a vehicle VIN number acquired with the aid of the optional bar-code scanner, via a license plate recognition—VIN lookup procedure, retrieved from a vehicle on-board processor or data store, or manually input by an operator at the start of a vehicle inspection, may be decoded as is known in the industry to identify sufficient vehicle identifying information for cross-referencing against a list of targets 475 or fixtures 477. Vehicle identifying information may include one or more of the following items: vehicle make, model, year of manufacture, vehicle identification code, and configuration. In a further embodiment of the present disclosure, the processing system 300 is configured with a set of software instructions to query an operator, such as through the GUI, to provide vehicle identifying information when needed during a vehicle service or inspection procedure. It will be understood that regardless of the source of the vehicle identifying information, sufficient information must be provided to enable the processing system 300 to present the operator with an identification of the specific target 475 or fixture 477 required to be utilized to complete the current vehicle onboard ADAS sensor inspection or calibration procedure.

Once the proper vehicle-specific target 475 or fixture 477 is identified by the processing system 300, the information is communicated to the operator together with any accompanying placement instructions, via an suitable interface, such as the GUI, and the inspection or calibration procedure is paused to permit the operator to retrieve the identified vehicle-specific target 475 or fixture 477 from a storage location. After the operator has placed a selected target 475 or fixture 477 within the vehicle service area, such as on a floor surface adjacent to the vehicle, or within a field of view of the camera modules 104, or has scanned an associated target identifying marking 404 with the bar-code scanning device 175, the operator provides a notification to the processing system 300 to resume the inspection or calibration procedure, at which time the operator's target selection, and optionally the target placement, is verified by the processing system.

Verification of vehicle-specific target 475 selection, and optionally, the target placement, is required to ensure that the vehicle onboard safety system sensors observe the proper target (at the proper relative location) during an inspection or calibration procedure. Failure to provide the proper vehicle-specific target 475 may result in a failure of the inspection or calibration procedure. Failure to properly place the vehicle-specific target 475 may result in either a failure of the procedure, or inaccurate results which may adversely affect vehicle safety system performance.

Figure 4:
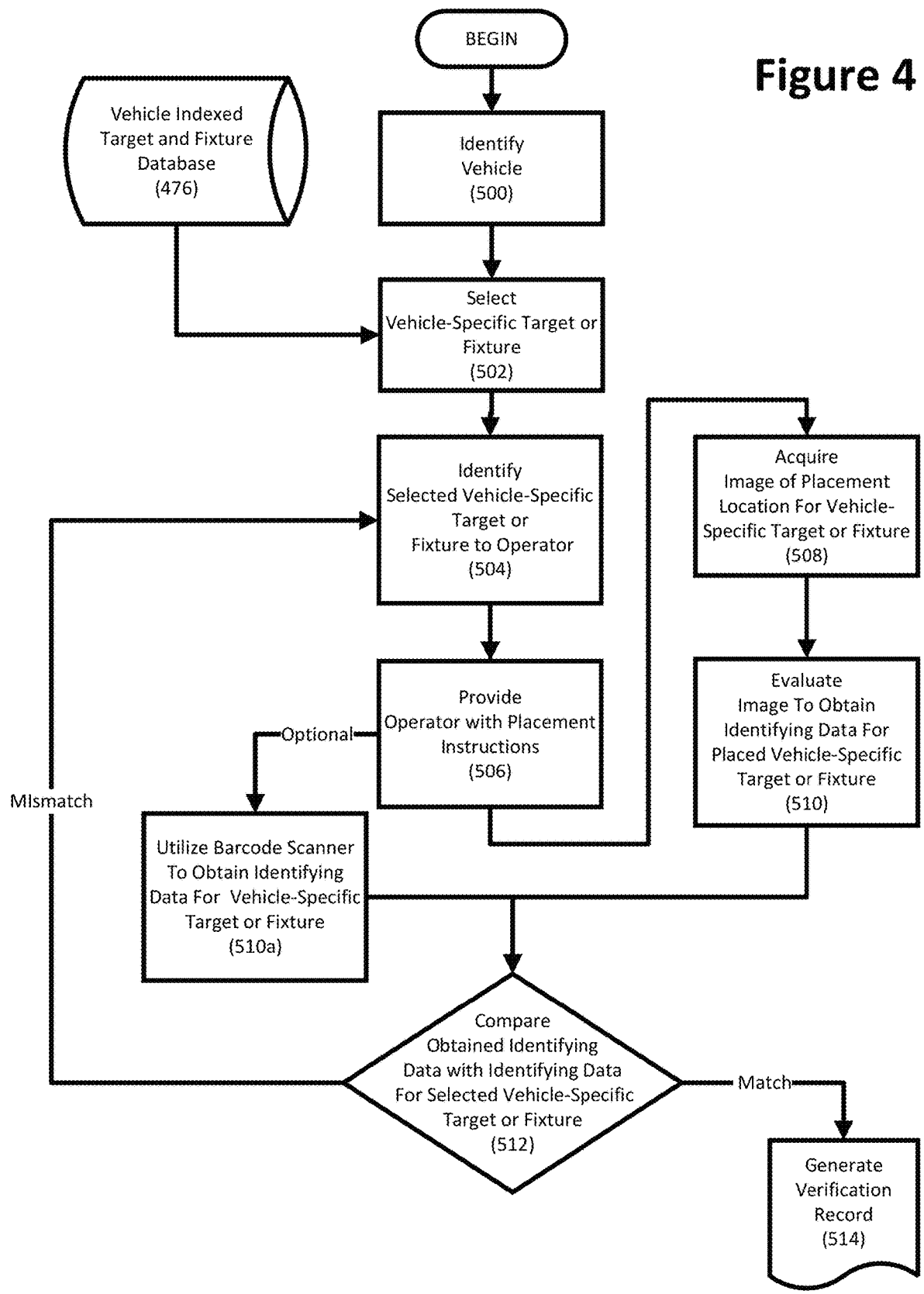
FIG. 4 is a flow chart of a procedure of the present disclosure.

In a method of the present disclosure, shown generally in the flowchart of FIG. 4, selection of a proper vehicle-specific target 475 is verified by a process of direct target observation and a cross-checking of visible target-specific markings. Initially, the vehicle is identified (Box 500) to the processing system. Vehicle identification can be completed manually by operator input through a GUI or other suitable interface, by communication of previously captured vehicle identifying data, or automatically by acquiring an image of the vehicle, a license plate, or other identifying marking, and referencing an appropriate look-up database. Following identification of the vehicle undergoing the service or inspection, a vehicle-specific target or fixture 477 is selected (Box 502) by accessing the vehicle-indexed target and fixture database 476. The selected target and/or fixture 477 is identified to the operator (Box 504) to enable the operator to retrieve the selected target 475 and/or fixture 477 from storage. Vehicle-specific targets 475 and fixture 477 available to the vehicle service system 100 each include at least one identifying marking 404 on a surface visible to at least one of the camera modules 104 when the vehicle-specific target 475 is located at the proper placement location. Once the selected target and/or fixture is retrieved from storage, the processing system provides the operator with placement instructions (Box 506) such as on a GUI, and/or provides the operator with placement guidance in the form of projected indicia. Following placement of the selected target and/or fixture by the operator, the processing system operates the camera modules 104 to acquire images (Box 508) of the placement location at which the selected target and/or fixture is expected to have been placed. The resulting images are evaluated by the processing system using conventional image processing techniques to confirm that a target and/or fixture is present and to obtain visible identifying data from the imaged target and/or fixture (Box 510).

The identifying markings 404 associated with the imaged target 475 and/or fixture 477 may be in the form of an alpha-numeric sequence, such as a serial number or part number, or may be in the form of a graphical pattern or symbol, such as a 2D or 3D bar code which is representative of a serial number or part number. In one embodiment, the identifying markings 404 are discrete from any features of the vehicle-specific target 475 which are utilized by a vehicle onboard ADAS sensor during an inspection or calibration procedure, so as to avoid interference with such procedures. For example, the identifying markings 404 may be located on a separate surface of the vehicle-specific target 475 or fixture 477 from any utilized features, or may be formed using a color, shade, hue, or contrast having a reduced visibility to the vehicle onboard ADAS sensor, but which remain visible to the observing camera modules 104. The size of the identifying markings may be below an observation threshold for the vehicle onboard ADAS sensor. In a further configuration, the identifying markings 404 may be configured in the form of a visible feature which is ignored by the vehicle onboard ADAS sensor.

Alternatively, in place of unique identifying markings 404 which are discrete from any features of the vehicle-specific target 475 utilized by a vehicle onboard ADAS sensor during an inspection or calibration procedure, the processing system 300 may be configured to utilize the markings present on the target surface intended for use by the vehicle onboard ADAS sensor as the identifying mark 404.

In an optional step, shown at Box 510a, particularly suitable for use with vehicle-specific targets 475 or fixtures 477 which are not disposed within the field of view of the camera modules 104, an optical bar-code scanning device is utilized by the operator to directly scan a 2D or 3D bar code identifying marking 404 located on a surface of the target or fixture before or after placement of the selected target and/or fixture.

Once the identifying markings 404 from a selected target 475 and/or fixture 477 are acquired, the processing system 300 compares the located or scanned identifying markings 404 (or the information represented or encoded by the located identifying mark 404) with ID data associated with the vehicle-specific target 475 previously identified to the operator for placement during the vehicle service or inspection procedure (Box 512). In the event an operator has selected and placed an incorrect vehicle-specific target 475 or fixture 477, the located identify mark 404 will be a mismatch to the ID data associated with the vehicle-specific target previously identified to the operator. The processing system 300 is configured to generate appropriate warnings to the operator via the GUI, and will repeat the process of directing the operator (Box 504) to locate and place the correct vehicle-specific target 475 or fixture 477, after which the target and/or fixture verification procedures (Boxes 508 and 510, or 510a) are repeated.

In the event that the comparison by the processing system 300 establishes a match between the located identifying mark 404 and the ID data for the vehicle-specific target 475 or fixture 477 previously identified to the operator, the selection of the correct vehicle-specific target 475 or fixture 477 from the available inventory of targets and/or fixture is verified (Box 514). Verification of the vehicle-specific target selection (and proper placement) is required before the processing system 300 continues with the ongoing vehicle service or inspection procedure. Optionally, verification of the vehicle-specific target 475 or fixture 477 may be recorded by the processing system as part of a service or inspection record for the vehicle, and/or communicated to a remote records storage or monitoring system via a suitable communications pathway, such as the Internet.

When combined with procedures for verifying correct target placement, verification of the correct selection of a vehicle-specific target 475 and/or fixture 477 reduced the risks associated with operator error during vehicle onboard ADAS sensor inspection and calibration procedures, and established a record of operator actions, as may be required to validate vehicle OEM warranty repairs.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle service system including at least one camera disposed to view objects within a vehicle service area, a set of available vehicle-specific targets and/or fixtures configured for observation by vehicle onboard ADAS sensors, and a processing system configured with a user interface and operatively coupled to said at least one camera, comprising:
    wherein said processing system is configured with software instructions to access a database of vehicle-specific information to select a vehicle-specific target and/or fixture for placement within a vehicle service area in response to an identification of a vehicle undergoing an ADAS sensor service procedure;
    wherein said processing system is configured with software instructions to direct an operator to place said selected vehicle-specific target and/or fixture within said vehicle service area;
    wherein said at least one camera is configured to acquire an image of at least a portion of said vehicle-specific target and/or fixture placed within said vehicle service area;
    wherein said processing system is configured with software instructions to evaluate said acquired image to detect data identifying which vehicle-specific target and/or fixture is visible with said acquired image; and
    wherein said processing system is further configured with software instructions to compare said identified vehicle-specific target and/or fixture with said selected vehicle-specific target and/or fixture to verify an operator's selection of said vehicle-spacific target or fixture from said set.

2. The vehicle service system of claim 1 wherein said identifying data associated with said positioned vehicle-specific target and/or fixture is an alpha-numeric sequence, a graphical pattern, a symbol, or a combination thereof.

3. The vehicle service system of claim 1 wherein said data identifying said positioned vehicle-specific target and/or fixture is discrete from features of said vehicle-specific target utilized by a vehicle onboard ADAS sensor during an inspection or calibration procedure.

4. The vehicle service system of claim 3 wherein said data identifying said positioned vehicle-specific target and/or fixture is not visible to said vehicle onboard ADAS sensor.

5. The vehicle service system of claim 1 wherein said data identifying said positioned vehicle-specific target and/or fixture is defined by features of said vehicle-specific target utilized by a vehicle onboard ADAS sensor during an inspection or calibration procedure.

6. The vehicle service system of claim 1 wherein said processing system is configured with software instructions to generate at least one of a record in response to said comparison verifying said operator's selection of said selected vehicle-specific target and/or fixture from said set, and a warning in response to said comparison failing to verify said operator's selection of said required vehicle-specific target or fixture from said set.

7. The vehicle service system of claim 1 wherein said camera is a hand held bar-code scanner configured to acquire an image of a portion of said vehicle-specific target and/or fixture wherein said portion includes either a 2D bar code or a 3D bar code identifying said vehicle-specific target and/or fixture.

8. A method for verifying an operator's selection of a vehicle-specific target or fixture from a set of available vehicle-specific targets or fixtures during a vehicle onboard ADAS sensor inspection or calibration procedure requiring placement of a vehicle-specific target or fixture relative to a vehicle within a service bay, comprising:
    accessing a data store to recall data identifying a selected vehicle-specific target or fixture from a set of targets and/or fixtures, required for use during said vehicle onboard ADAS sensor inspection or calibration procedure;
    directing positioning of said identified vehicle-specific target or fixture within said vehicle service bay;
    acquiring an image of at least a portion of said positioned vehicle-specific target or fixture within said vehicle service bay;
    evaluating, with a processing system, said acquired image to extract data identifying said positioned vehicle-specific target or fixture within said acquired image; and
    comparing an identity of said positioned vehicle-specific target or fixture with said selected vehicle-specific target or fixture to verify said positioned vehicle-specific target or fixtures matches said selected vehicle-specific target or fixture.

9. The method of claim 8 wherein recalling, from said accessible data store, data identifying said vehicle-specific target or fixture further includes initially identifying said vehicle within said service bay by at least one of a VIN, make, model, and year.

10. The method of claim 8 wherein evaluating said acquired image to extract identifying data includes decoding at least one of an alpha-numeric sequence, a 2D barcode, and a 3D barcode observed within said acquired image on a surface of said placed vehicle-specific target or fixture.

11. The method of claim 8 further including at least one of (a) generating a record in response to said comparison verifying said positioned vehicle-specific target or fixture matches said required vehicle-specific target or fixture, and (b) generating a warning in response to said comparison failing to verify a match between said positioned vehicle-specific target or fixture and said required vehicle-specific target or fixture.

12. A method for detecting an incorrect selection of a vehicle-specific target and/or fixture by an operator from a set of available vehicle-specific targets and/or fixtures during a vehicle onboard ADAS sensor inspection or calibration procedure requiring placement of a vehicle-specific target and/or fixture relative to a known vehicle within a service bay, comprising:

retrieving, from an accessible data store, data identifying a required vehicle-specific target and/or fixture for use during said vehicle onboard ADAS sensor inspection or calibration procedure associated with said known vehicle;

identifying said required vehicle-specific target and/or fixture to said operator to enable placement of a selected vehicle-specific target and/or fixture by said operator relative to said known vehicle within said service bay;

obtaining data identifying said selected vehicle-specific target and/or fixture following said placement within said service bay by said operator; and comparing said obtained data with said retrieved data to generate a warning to said operator responsive to a mismatch between said obtained data and said retrieved data.

13. The method of claim 12 wherein retrieving said identifying data from said accessible data store further includes initially identifying said known vehicle by at least one of a VIN, make, model, and year, and utilizing said identification of said known vehicle to locate said identifying data within said accessible data store.

14. The method of claim 12 wherein obtaining data identifying said selected vehicle-specific target and/or fixture includes acquiring an image of said selected vehicle-specific target and/or fixture; and evaluating said acquired image to locate said identifying data associated with said selected vehicle-specific target and/or fixture.

15. The method of claim 12 wherein obtaining data identifying said selected vehicle-specific target and/or fixture includes scanning a barcode associated with said selected vehicle-specific target and/or fixture, and decoding said scanned barcode to extract said identifying data.

* * * * *